United States Patent Office 3,539,661
Patented Nov. 10, 1970

3,539,661
PROCESS FOR PRODUCING
SELF-CURING POLYMERS
Harald Rauch-Puntigam, Graz, Austria, assignor to Vianova Kunstharz A.G., Graz, Austria, an Austrian company
No Drawing. Filed July 21, 1967, Ser. No. 654,949
Claims priority, application Austria, July 16, 1966,
A 7,125/66; Feb. 21, 1967, A 1,691/67
Int. Cl. C08f 1/74, 15/32
U.S. Cl. 260—856      6 Claims

ABSTRACT OF THE DISCLOSURE

A process for producing self-curing polymers comprising the steps of (I) reacting a compound having the general formula

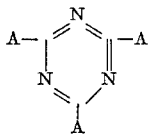
(a)

wherein A is a member of the group consisting of

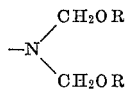

and

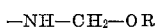

R being a member of the group consisting of hydrogen and an alkyl radical having a maximum of 4 carbon atoms, with a compound having the general formula selected from the group consisting of

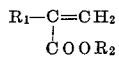
(b)

and

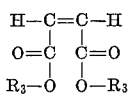
(c)

$R_1$ being a member of the group consisting of hydrogen and methyl; $R_2$ being a member of the group consisting of hydrogen, and a hydroxy alkylene radical having a maximum of 5 carbon atoms; $R_3$ being a member of the group consisting of hydrogen, an alkyl radical having a maximum of 10 carbon atoms, and a hydroxy alkylene radical having a maximum of 5 carbon atoms; and (II) co-polymerizing the reaction product of (I) with polymerizable ethylenically unsaturated compounds is described. The polymers obtained are valuable in formulating temporary and permanent protective coatings.

---

The present invention concerns a process for the production of self-curing polymers of acrylic acid, methacrylic acid, maleic acid, and fumaric acid, which are particularly suitable for use as coating agents. It is known (Helv. Chim. Acta 24, 318 E, 1941) to convert hexamethoxymethyl melamine into the corresponding butyl derivative by transetherifying with higher alcohols, e.g., butanol, concentrated hydrochloric acid being used as catalyst. Further, reactions of hexabutoxymethyl melamine with higher fatty acids, which are carried out in the presence of hydrophosphorous acid and lead to the corresponding fatty acid esters of hexamethylol melamine, are also known from DRP 907,132. Attempts to utilize the aforesaid techniques to effect the reaction of N-substituted melamine derivatives with derivatives of acrylic acid, methacrylic acid, maleic acid or fumaric acid have been unsuccessful, however, as the reaction mass gels during the reaction.

It has now been found that the reaction of N-substituted melamine derivatives with derivatives of acrylic acid, methacrylic acid, maleic acid or fumaric acid can be carried out easily under the catalytic action of suitable compounds, preferably solid state cataylsts.

In the method of the invention a compound of the general Formula I

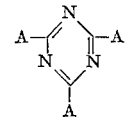
(I)

in which A is

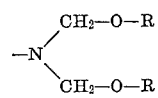

or —NH—$CH_2$—O—R, and R is hydrogen or an alkyl radical with up to 4 carbon atoms, is reacted with a compound of the general Formula II

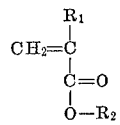
(II)

in which $R_1$ is hydrogen or the methyl group, and $R_2$ is hydrogen or a straight chain or branched hydroxy-alkylene radical having a maximum of 5 carbon atoms, or general Formula III

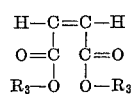
(III)

in which $R_3$ is hydrogen, an alkyl radical having a maximum of 10 carbon atoms, or a straight chain or branched hydroxy-alkylene redical having a maximum of 5 carbon atoms, in the presence of a suitable catalyst. The reaction product is then co-polymerized in known manner with other ethylenically unsaturated polymerizable compounds.

The reaction takes place readily between 50° C. and 150° C. in the presence or absence of inert solvents, with or without the addition of polymerization inhibitors. The alkanol liberated during the reaction is optionally withdrawn with the use of diminished pressure. Volatile hydrocarbons, such as toluene or xylene, which also serve as entraining agents for the liberated alkanol are suitable as inert solvents.

Suitable solid state catalysts for the reaction include synthetic cation exchangers or silicates of the montmorillonite type in the acid state, that is to say, hydrogen ion charged. The acid-activated commercially available montmorillonite catalysts are particularly suitable. The amount of catalyst used may be between 1 percent and 20 percent of the total weight. The progress of the reaction is controlled, when using acids of the general Formula II or III, by means of the decreasing acid number; and, when reacting oxy-esters of the general Formula II or III, by means of the decreasing hydroxyl number. After the completion of the reaction, the still hot product may be separated from the catalyst, and aromatic hydrocarbons are removed in vacuum, if such are present. It is an advantage of the invention that the catalyst can be used repeatedly.

Polymethylol melamines, completely or partly etherified with alkanols having up to 4 carbon atoms are suitable as compounds of general Formula I.

The following are compounds of the general Formula II that are particularly suitable for reaction with the compounds of the general Formula I: e.g., acrylic acid, hydroxy alkylene esters of acrylic acid, such as acrylic acid monoethylene glycol ester, methacrylic acid, hydroxy alkylene esters of methacrylic acid, such as methacrylic acid monoethylene glycol ester, and methacrylic acid monopropylene glycol ester.

The following are compounds of the general Formula III that are particularly suitable for reaction with the compounds of general Formula I: e.g., maleic acid, fumaric acid, esters of maleic and fumaric acid, such as maleic acid ethyl ester, maleic acid butyl ester, maleic acid octyl ester, the corresponding fumaric acid esters, and oxyalkyl esters of maleic and fumaric acid, e.g., maleic acid monoethyl mono glycol ester, maleic acid monobutyl monoglycol ester, maleic acid monooctyl monopropylene glycol ester, and fumaric acid mono ethyl mono glycol ester.

The polymerization of the monomers produced from the compounds of general Formula I and II or III can be carried out with suitable co-monomers in solution, in the mass or by emulsion or bead polymerization. The conditions for the various polymerization methods are known to those skilled in the art. The choice of the polymerizable co-monomers depends on the application intended and on the desired properties. In particular, the following come into consideration: styrene and substituted styrenes, acrylic and methacrylic esters, acids, amides and nitriles, as well as maleic and fumaric acid derivatives.

The polymers are curable without the adidtion of further curing agents, the mechanism being probably comparable to that of the hardening of co-polymers containing oxy or carboxyl groups, with melamine resins. Resin combinations of this kind are used as coating compositions and are described, e.g., in British Patent No. 939,211 or U.S. Pat. No. 2,681,897. These combinations, however, in comparison with the products produced according to the invention, have the disadvantage that on the curing of the mixtures there is not only occurring the reaction of the co-polymers with the melamine resin but also self-condensation of the latter. This undesirable self-condensation takes place particularly in a more strongly acid medium, and leads to incompatibility and thus to a reduction in gloss. Furthermore, relatively high percentages of melamine resin are necessary for the cross-linking reaction, since a considerable part is withdrawn from the actual hardening reaction as a result of self-condensation.

A further disadvantage of two component systems arises, if the application of the polymers is carried out by way of electro-deposition. In this process, as a result of the differences in migration velocity of the components, considerable difficulties occur. On the one hand, the resulting films have inadequate properties, on the other hand, bath composition alters. In contrast to this, with the use of the products of the invention, these difficulties are not encountered, since the products are one component systems.

The polymers of the invention can be mixed with, e.g., alkyd resins, acrylic resins, epoxy resins, urea resins or melamine resins.

The application of the pigmented or non-pigmented resins can take place by spraying, brushing, dipping, flow coating or by electro-deposition.

The following examples serve to illustrate the process; all parts are vy weight.

EXAMPLE 1

(a)

| | Parts |
|---|---|
| Hexamethoxymethyl melamine | 195 |
| Acrylic acid | 33 |
| Hydroquinone | 0.035 |
| Montmorillonit catalyst, KSF | 11 |
| Toluene | 240 | are charged into a reaction vessel fitted with a water separator, stirrer and cooler, and, with stirring, are brought to an internal temperature of 110° C. The liberated methanol distills off with the toluene as an entraining agent by way of the water separator, the toluene being progressively replaced by fresh toluene. The progress of the reaction is controlled by observing the decrease of the acid number. After approximately six hours, an acid number of 7 is reached. The reaction is stopped, the catalyst is separated from the reaction material by filtration, and the mixture is concentrated to 90 percent solids content.

(b)

| | Parts |
|---|---|
| (Parts of product a), 90% solids content | 66.5 |
| Acrylic acid butyl ester | 30 |
| Styrene | 40 |
| Xylene | 50 |
| Butanol | 20 |
| Cumene hydroperoxide, 70% active material | 1 |
| Tertiary dodecylmercaptan technical | 0.6 |

The materials are mixed, and a third of the mixture is charged into a glass flask with stirrer, thermometer, reflux condenser and dropping funnel. The contents of the flask are heated with stirring, under nitrogen, and on reaching reflux temperature the remaining two thirds of the mixture are added within two hours. The progress of the polymerization is controlled by watching the development of solids content. It is necessary that conversion of the reactants be substantially complete and further accelerator is added if required. After completion of the polymerization the solids content is adjusted to 50 percent with xylene.

To prepare a white enamel, the resin is ground with titanium dioxide in a disc mill in a ratio of 1:0.7, then sprayed onto panels, and stored for 30 minutes at 150° C. The resulting film is white, very glossy, flexible and hard. The film was not affected when rubbed for 60 seconds with a xylene-saturated pad of cotton-wool.

EXAMPLE 2

| | Parts |
|---|---|
| Hexamethoxymethyl melamine | 390 |
| Methacrylic acid | 86 |
| Hydroquinone | 0.07 |
| Toluene | 500 |
| Montmorillonite catalyst KSF (filtered off Example 1a) | 23 | are mixed and condensed as in Example (1a) with circulation of toluene, and the reaction is maintained until an acid number of 5.5 is reached. The catalyst is removed by filtration, and the mixture is brought to a solid content of 80 percent under vacuum.

The co-polymerization of this product is carried out as described in Example (1b).

EXAMPLE 3

(a)

| | Parts |
|---|---|
| Hexamethoxymethyl melamine | 390 |
| Methacrylic acid monoglycol ester | 123 |
| Hydroquinone | 0.13 |
| Montmorillonite catalyst KSF | 26 |
| Toluene | 540 | are mixed and condensed as described in Example (1a). To control the progress of the reaction hydroxyl number determinations are made, and the reaction is interrupted at a hydroxyl number of 13. The catalyst is again separated by filtration.

(b)

| | Parts |
|---|---|
| Product (3a), 67% solids content | 89 |
| Acrylic acid butyl ester | 60 |
| Styrene | 80 |
| Xylene | 71 |
| Butanol | 40 |
| Cumene hydroperoxide, 70% active material | 1 |
| Dodecylmercaptan technical | 1 | are subjected to a free-radical polymerization according to the procedure of Example 1.

For the production of a white enamel, the product is pigmented with titanium dioxide and the films are stoved for 30 minutes at 150° C. The coatings do not achieve the hardness of the coatings of Example 1, but they are more flexible. The resistance of the film to alkalis (5 hours immersion in 10% hot caustic soda) is excellent.

EXAMPLE 4

| | Parts |
|---|---|
| Melamine resin Viamin M 2, 65% solids content | 3075 |
| Methacrylic acid | 86 |
| Hydroquinone | 0.07 |
| Montmorillonite catalyst KSF | 23 |
| Toluene | 2110 | are mixed and the mixture is heated as in Example 1. After nine hours, the acid number falls to 15. The mixture is filtered off from the catalyst and concentrated in vacuum.

To make a resin for surface coatings, 85 parts of this reaction product of 71% solid content and

| | Parts |
|---|---|
| Acrylic acid butyl ester | 50 |
| Acrylic acid ethyl ester | 20 |
| Styrene | 70 |
| Xylene | 75 |
| Butanol | 40 |
| Cumene hydroperoxide, 70% active material | 2 | are subjected to a free-radical polymerization as described in Example 1.

The film produced from the pigmented resin is, after stoving, white, very glossy, hard and very flexible. Its resistance to detergents and caustic soda is very good.

EXAMPLE 5

| | Parts |
|---|---|
| Hexamethoxymethyl melamine | 390 |
| Acrylic acid monopropylene glycol ester | 130 |
| Hydroquinone | 0.13 |
| Acid cation exchanger (Ionenaustauscher I) | 26 | are mixed and heated to 97° C., the equipment being the same as with the condensation taking place in the presence of solvents, in accordance with Examples 1-4. A distillate distills off in the water separator, which consists substantially of methanol. After four hours the mixture, still hot, is filtered off from the catalyst under pressure. A clear, highly viscous end-product is obtained. Co-polymerization can be conducted as described in Example 1.

EXAMPLE 6

| | Parts |
|---|---|
| Hexabutoxymethyl melamine | 341 |
| Acrylic acid | 34 |
| Hydroquinone | 0.035 |
| Montmorillonite KSF catalyst | 19 |
| Xylene | 375 | are mixed and heated as described in Example 1. When the acid number reaches 9, the reaction is stopped, the catalyst removed by filtration, and the reaction product is subjected to a free-radical co-polymerization in the way described in Example 1.

EXAMPLE 7

| | Parts |
|---|---|
| Reaction product of Example 2 | 40 |
| Acrylic acid | 6 |
| Acrylic acid butyl ester | 27 |
| Styrene | 32 |
| Ethyl glycol | 25 |
| N-butanol | 25 |
| Cumene hydroperoxide, 70% active material | 1 |
| Tertiary dodecylmercaptan | 2.5 | are polymerized under reflux, 0.5 part cumene hydroperoxide, dissolved in 5 parts of ethylene glycol monoethyl ether being added after two hours and again after a further two hours.

The polymer is neutralized with triethyl amine, pigmented with titanium dioxide at a pigment/binder ratio of 33/100, and diluted with water to a resin solids content of 10 percent. After connection to direct current, an anode dipped into the aqueous solution is coated, and the film stoved at 150° C. A hard white film forms. With a coating time of one minute and an applied voltage of 100 volts, a dry film thickness of 15 microns is obtained; and with 120 volts, a film 20 microns thick. Passage of current 3 ma./cm.$^2$ for one minute produces a dry film thickness of 15-20 microns.

EXAMPLE 8

(a)

| | Parts |
|---|---|
| Hexamethoxymethyl melamine | 390 |
| Maleic acid monoethyl ester | 144 |
| Hydroquinone | 0.14 |
| Montmorillonit KSF catalyst | 27 |
| Toluene | 530 | are charged into a reaction vessel equipped as in Example 1 and are heated to reflux temperature. The methanol liberated during the condensation distills off with the toluene as an entraining agent by way of the water separator, the toluene being progressively replaced by fresh toluene.

At the beginning of the reaction, the acid value is about 99 (theoretical value 107), after one hour the acid value falls to 26, after two hours to 12, and reaches 9 after 2½ hours. The reaction is stopped, the catalyst is removed from the reaction mass by filtration, and the reaction mass is concentrated to 86 percent solids content in vacuum.

(b)

| | Parts |
|---|---|
| Reaction product (8a) 86% solids content | 81 |
| Acrylic acid butyl ester | 60 |
| Styrene | 70 |
| Xylene | 89 |
| Butanol | 40 |
| Cumene hydroperoxide, 70% active material | 2 |
| Tertiary dodecylmercaptan, technical | 5 | are mixed. One third of the mixture is charged into a reaction vessel and is heated to reflux temperature under nitrogen. On reaching reflux temperature the remaining two thirds of the mixture are added within three hours. Further accelerator is added and the mass kept at reflux temperature for an additional two hours.

The resin can be diluted with xylene and, after application to panels and stoving for 30 minutes at 150° C. gives hard and flexible films of good gloss.

EXAMPLE 9

(a)

| | Parts |
|---|---|
| Maleic acid monobutyl ester | 172 |
| Hexamethoxymethyl melamine | 390 |
| Toluene | 560 |
| Hydroquinone | 0.17 |
| Montmorillonite KSF catalyst | 28 | are reacted as described in Example 8.

At the beginning of the reaction, the acid value is 101 (theoretical value 104), after one hour it falls to 21, after 1½ hours to 11, and reaches 7 after two hours. The reaction mass is filtered through a warmed filter press with pressure, and the product is concentrated in vacuum to a solids content of 73.5 percent.

(b)

| | Parts |
|---|---|
| Reaction product (9a), 73.5% solids content | 40.8 |
| Acrylic acid butyl ester | 20 |
| Styrene | 35 |
| Acrylic acid ethyl ester | 15 |
| Xylene | 39.2 |
| Butanol | 20 |
| Cumene hydroperoxide, 70% active material | 2 |
| Tertiary dodecylmercaptan, technical | 1 | are mixed. The mixture is polymerized in a three neck flask under reflux. 1 part of cumene hydroperoxide is added at the beginning of the refluxing. In order to achieve substantial completion of the conversion, two portions of 0.5 part each of cumene hydroperoxide are added during the refluxing.

The resin is blended with an epoxy resin, e.g., Epon 1001, in a ratio of 10:1, and 3 percent (based on solids content) of triethyl amine are added. Coatings of this blend are stoved at 150° C. and give white, glossy films with good hardness and flexibility.

EXAMPLE 10

(a)

| | Parts |
|---|---|
| Hexamethoxymethyl melamine | 390 |
| Maleic acid monobutyl monoglycol ester | 216 |
| Hydroquinone | 0.1 |
| Montmorillonit KSF catalyst | 15 |
| Toluene | 606 | are reacted as described in Example 8. After three hours of solvent cook with toluene the reaction is stopped and the catalyst is removed by filtration under pressure. The solution is then concentrated in vacuum to a solids content of 71 percent.

(b)

| | Parts |
|---|---|
| Reaction product (10a), 71% solids content | 43 |
| Methacrylic acid | 2 |
| Styrene | 34 |
| Methacrylic acid butyl ester | 34 |
| Xylene | 37 |
| Butanol | 20 |
| Cumene hydroperoxide, 70% active material | 2 | are mixed and polymerized as described in Example 8. The resin is diluted with xylene to a solids content of 50 percent and has a viscosity of 65'' at 20° C. measured in a DIN-cup No. 4.

The resin is pigmented with titanium dioxide in a pigment/binder ratio of 70:100, and coated panels are stoved for 30 minutes at 150° C. The films have a high gloss, good adhesion and extraordinary flexibility. The pencil hardness is H.

In the aforesaid examples, the melamine resin designated Viamin M 2 is a partly etherified methylolated melamine resin marketed by Vianova Kunstharz Aktiengesellschaft, Vienna, Austria;

Epon 1001 is an epoxy resin marketed by the Shell Chemical Company which is the condensation product of epichlorohydrin and bisphenol-A;

Ionenaustauscher I is a strongly acidic cation exchange resin being a derivative of polystyrene, marketed by E. Merck A.G., Darmstadt; [a description of this catalyst appears in H. Römpp, Chemie-Lexikon (Franckh'sche Verlagshandlung, 1966), Band II, page 2976; E. Merck, Chemikalienkatalog, 1967 at page 210; Ullmanns Encyklopädie der Technischen Chemie, 1953, page 542; and Ullmanns Encyklopadie der Technischen Chemie, 1957, p. 801] and Montmorillonit catalyst KSF is a montmorillonite catalyst marketed by Süd-Chemie A.G., Munchen, and characterized by acid activation of montmorillonit [a description of this catalyst appears in a brochure of Süd-Chemie, A.G., Munchen dated January 1961; and H. Römpp, Chemie-Lexikon (Franckh'sche Verlagshandlung, 1966), pages 4150–51].

It is claimed:

1. A process for producing self-curing polymers comprising the steps of (I) reacting at a temperature below about 150° C. a compound having the general formula

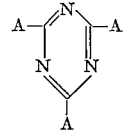  (a)

wherein A is a member of the group consisting of

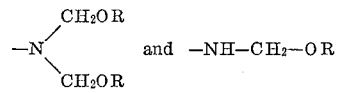

R being a member of the group consisting of hydrogen and an alkyl radical having a maximum of 4 carbon atoms, with a compound having the general formula selected from the group consisting of

  (b)

and

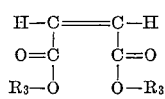  (c)

$R_1$ being a member of the group consisting of hydrogen and methyl, $R_2$ being a member of the group consisting of hydrogen, and a hydroxy alkylene radical having a maximum of 5 carbon atoms, $R_3$ being a member of the group consisting of hydrogen, an alkyl radical having a maximum of 10 carbon atoms, and a hydroxy alkylene radical having a maximum of 5 carbon atoms, in the presence of a solid acidic catalyst which is a member of the group consisting of synthetic ion-exchange resins and activated silicates of the montmorillonite type, whose exchangeable cations are substantially replaced by hydrogen ions; and (II) co-polymerizing the reaction product of (I) with polymerizable ethylenically unsaturated compounds.

2. The process according to claim 1 wherein the synthetic ion-exchange resin for reaction (I) is a member of the group consisting of polystyrene derivatives with sulfonic groups substituted in the aromatic nuclei.

3. The process according to claim 1 wherein the montmorillonite type catalyst is an acid activated silicate being a member of the group of aluminum hydrosilicates with the ideal formulas $Al_2(Si_4O_{10}/OH/_2 \cdot nH_2O$ and $Al_2(/OH/_2 \cdot AlSi_3O_9 \cdot OH) \cdot 4H_2O$.

4. The process according to claim 1 wherein reaction (I) is carried out in the presence of aromatic hydrocarbons.

5. The process according to claim 1 wherein compound (b) is a member of the group consisting of acrylic acid, hydroxy alkylene esters of acrylic acid, methacrylic acid, and hydroxy alkylene esters of methacrylic acid; and the compound (c) is a member of the group consisting of maleic acid, fumaric acid, esters of maleic and fumaric acid, and oxyalkyl esters of maleic and fumaric acid.

6. The process according to claim 1 wherein the solid acidic catalyst is present at from 1–20 weight percent and the mol ratio of (a) and (b) or (c) is from about 1 mol of (a) to about 0.8–1 mol of (b) or (c).

References Cited

UNITED STATES PATENTS 3,020,255  2/1962  Magrane et al. _____ 260—856
3,396,209  8/1968  Sekmakas et al. _____ 260—856

FOREIGN PATENTS 211,109  1/1957  Australia.
653,193  3/1965  Belgium.
628,150  8/1946  Great Britain.

JOHN C. BLEUTGE, Primary Examiner

U.S. Cl. X.R.

117—161; 204—181; 260—29.4, 33.6, 39, 41, 67.6, 78.5, 80.72, 249.6, 834, 837, 850, 851